Dec. 29, 1970 S. B. VENZKE 3,551,847
LOW FREQUENCY GENERATOR
Filed Feb. 10, 1969
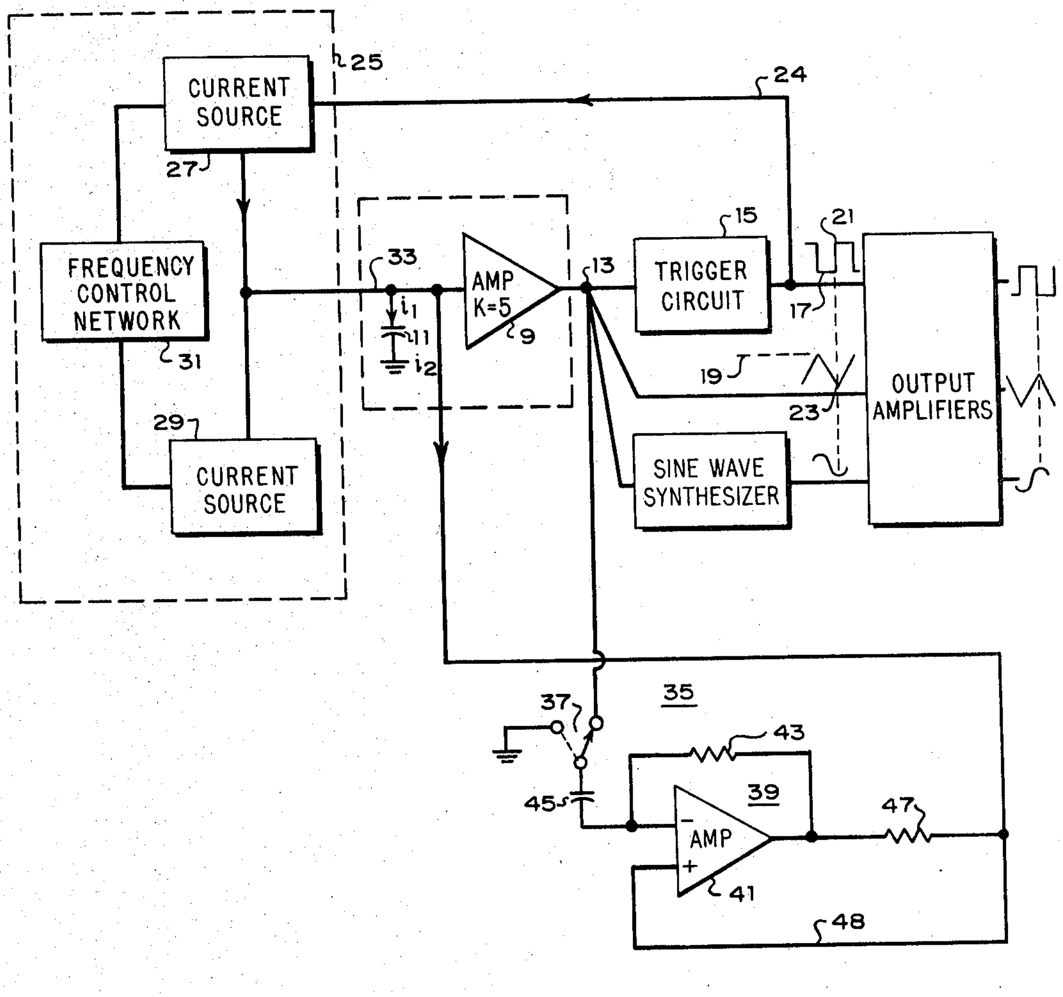
INVENTOR
STEPHEN B. VENZKE
BY A. C. Smith
ATTORNEY United States Patent Office 3,551,847

Patented Dec. 29, 1970

3,551,847

LOW FREQUENCY GENERATOR

Stephen B. Venzke, Loveland, Colo., assignor to Hewlett-Packard Company, Palo Alto, Calif., a corporation of California Filed Feb. 10, 1969, Ser. No. 797,758
Int. Cl. H03k 3/02
U.S. Cl. 331—143 3 Claims

ABSTRACT OF THE DISCLOSURE

A low-frequency function generator includes an integrator which produces a triangle waveform from an applied square wave and which includes two feedback circuits around an operational amplifier. The first feedback path includes a capacitor and the second feedback path includes a complex circuit which alters the current division between the two feedback ciruits for produing ultralow frequencies using only low values of capacitance in the first feedback path.

BACKGROUND OF THE INVENTION

A conventional low-frequency function generator typically includes an integrator connected to receive square waves from a trigger circuit which, in turn, is triggered each time the output of the integrator attains the value of upper and lower set limits of amplitude. The frequency of operation may be conveniently controlled by varying the integrator capacitance or by varying the magnitude of the square wave current applied to the integrator. However, where the operation frequency must be varied over several decades down to frequencies of the order of $10^{-4}$ Hertz, the physical size of the integrator capacitance required for operation at such ultralow frequencies becomes prohibitively large for use in compact transistorized equipment.

SUMMARY OF THE INVENTION

Accordingly, the present invention includes an additional feedback circuit around an operational integrator to permit ultralow frequency operation using an integrator capacitor of smaller value and physical size. The additional feedback circuit includes a differentiator and the resulting current division between the feedback circuits that occurs at the input of the integrator permits frequency control simply by square wave altering the ratio of resistances used in the additional feedback circuit.

DESCRIPTION OF THE DRAWING

The drawing is a schematic diagram of a function generator including an additional feedback circuit in accordance with one embodiment of the present invention.

DESCRIPTION OF THE PREFERRED EMBODIMENT

Referring to the drawing, there is shown an integrator comprising a capacitor 11 and an amplifier 9. The output 13 of the integrator is applied to a suitable trigger circuit 15 which is triggered to one output level 17 in response to the output 13 of the integrator attaining the value of an upper amplitude limit 19 and which is triggered to another, higher output level 21 in response to the output 13 of the integrator attaining the value of a lower amplitude limit 23. Circuits which operate in this manner are described in the literature (see, for example, U.S. Pat. 2,748,272, entitled Frequency Generator, issued on May 29, 1956, to N. B. Schrock).

The output square wave 17, 21 from the circuit 15 is applied via line 24 to the source 25 of integrator current which includes a pair of current sources 27, 29 and a network 31 coupled to the sources 27, 29 for altering the currents therefrom to control the operating frequency.

The square wave signal on line 24 is applied to current source 27 to control its operation of supplying current $i$ in response to the integrator output attaining the upper limit 19 (i.e. while the square wave output is at the lower amplitude level 17). Current source 27 is selected to supply direct current in opposition to the direct current from source 29 and with an ampiltude that is larger (say, twice as large) than the amplitude of the current supplied by source 29. The resultant current flowing into the input of the integrator 9, 11 has a fixed absolute magnitude and alternates in direction in response to the output from circuit 15. Current sources in a circuit of this type are described in the laterature (see, for example, U.S. patent application Ser. No. 505,796, and now Pat. No. 3,440,448 filed on Nov. 1, 1965, by R. L. Dudley and entitled Generator for Producing Symmetrical Triangular Waves of Variable Repetition Rate).

The operating frequency of the described portion of the circuit is determined by the rate at which the input current to the integrator 9, 11 is supplied and the size of the integrating capacitor 11. Thus, the amplitude of the input current supplied to the input 33 of the integrator 9, 11 and the value of capacitor 11 may be conveniently varied to alter the rate at which the integrator output 13 varies with time between limits 19, 23 and thereby to vary the operating frequency. However, where variation of the operating frequency over several decades is required using current sources 27, 29 of convenient design and with an ultralow frequency limit of the order of $10^{-4}$ Hertz, the value of capacitor 11 may, in practice, have to be larger than 2,000 microfarads. The physical size of such a capacitor is prohibitively large for use in compact, transistorized equipment.

In accordance with the present invention, the additional feedback circuit 35 may be connected in parallel with amplifier 9 via switch 37 to relax the requirement for large values of capacitor 11 and make possible the more convenient use of resistors of various resistance values, the physical size of which typically do not vary with resistance value. This additional feedback circuit 35 includes an operational-type differeniating stage 39 connected to receive the output 13 of the integrator 9, 11. Where an operational-type integrator is used in place of integrator 9, 11, a phase-inverting stage may be included in the feedback circuit 35 to establish the proper phase relationship around the signal loop. The differentiator stage 39 includes a differential amplifier 41 with a feedback resistor 43 connected around the amplifier 41 to the signal inverting input and with an output coupling resistor 47 connected back to the input 33 of the integrator 9, 11. An input coupling capacitor 45 is connected through switch 37 to receive the integrator output 13 and a local feedback path 48 connected from the input of amplifier 9 to the noninverting input of amplifier 41. The feedback path 35 connected between the output 13 and input 33 of amplifier 9 produces a division of the input current at 33 between the capacitor 11 and the feedback path 35 and the division ratio may be shown to be:

$$\frac{i_2}{i_1}=(K-1)\cdot\frac{R_{43}}{R_{47}}\cdot\frac{C_{45}}{C_{11}} \qquad (1)$$

The operating frequency decreases as $i_2$ increases because some of the input current to the integrator 9, 11 is diverted from capacitor 11 and flows away from the input 33 as current $i_2$. Thus, for convenient capacitance values for $C_{11}$ and $C_{45}$ of Equation 1, the value of current $i_2$ may be altered simply by altering the ratio of $R_{43}$ to $R_{47}$ so that the operating frequency decreases as this ratio increases. In practice, the capacitor 11 may be a convenient value and size (say, 10 microfarads) and the ultralow frequency of about $10^{-4}$ Hertz may be attained using a resistor $R_{43}$ of about 10 megohms. Thus, since the physical size of resistor $R_{43}$ does not have to vary with resistance value using commercially available components, the circuit of the present invention may be compactly assembled for operation over several frequency decades down to ultralow frequencies using circuit components of convenient, small size.

I claim:

1. Signalling apparatus comprising:
integrator means having an input and an output;
source means connected to the input of said integrator means for supplying thereto selected ones of at least two values of current in response to control signal applied thereto;
detector means responsive to variation of signal at the output of said integrator means between first and second amplitude limits for supplying control signal to said source means to select the value of current supplied thereby to said input for producing signal at said output that varies with time between said first and second amplitude limits; and
feedback means connected between the input and output of said integrator means and including differentiating means for selectively altering the portion of the current supplied to said input from said source means which is integrated by said integrator means thereby to alter the rate at which signal appearing at said output varies between said first and second amplitude limits.

2 Signalling apparatus as in claim 1 wherein said feedback means includes a coupling resistor connecting the output of said differentiating means to the input of said integrator means.

3. Signalling apparatus as in claim 1 wherein said differentiator means includes a signal-inverting amplifier having an input and an output, resistive feedback means connected between the input and output of said signal-inverting amplifier, and resistive means connecting the output of said amplifier to the input of said integrator means, whereby the rate at which signal appearing at the output of said integrator means varies between said first and second amplitude limits may be altered by altering the ratio of the resistance included in said resistive feedback means to the resistance included in said resistive means.

References Cited

UNITED STATES PATENTS 3,440,448 4/1969 Dudley ---------- 307—228X

JOHN KOMINSKI, Primary Examiner

J. B. MULLINS, Assistant Examiner

U.S. Cl. X.R.

331—61